United States Patent Office 2,931,733
Patented Apr. 5, 1960

2,931,733
PLASTERING MATERIAL

Kenneth Busk Covert, Robert W. Park, and Uriah Marion Brist, Stafford County, Va., assignors to Pabcor, Incorporated, Fredericksburg, Va., a corporation of Virginia No Drawing. Application June 12, 1957
Serial No. 665,880

8 Claims. (Cl. 106—91)

This invention relates to a plastering material and the composition of materials from which it is made.

Plaster has long been recognized as a superior finish material for interior walls, but its use has been curtailed somewhat due to labor costs in applying it, its weight, and the time interval necessary for drying before other work can be done. Use of light-weight materials has overcome one of the objections, but the other two remain.

The usual procedure in plastering is to apply a brown, or under, coat over lath structure of some kind and, when this coat is dry, apply a finish, white coat. The brown coat is rough textured, and is used to provide a base for the finish coat and body and strength to the completed wall. The white coat provides a smooth, finished appearance to the wall and the requisite surface hardness. Each coat must be put on and allowed to dry for periods of from four days to one week before further work can be done. Scaffolding has to be erected to reach ceiling and upper wall areas and removed as work progresses. With two coat application, the scaffolding must be erected and dismantled twice.

It is the object of the present invention to provide a plastering material which can be applied as a one coat finish for walls, which will have the body and strength of the conventional under, or brown, coat and the hardness and surface smoothness of the white or finish coat.

It is another object of the invention to provide such a material which can be given many different surface finishes by trowelling without the necessity of changing the composition.

Another object is to provide a material of this kind which can be applied to provide a finished wall at great savings in labor and time, thus considerably reducing the cost of plaster work.

Other objects of the invention will become apparent from the following description of the material and its composition.

The composition which has been found to be satisfactory as a one coat plaster consists of lime, aggregate or filler, gauging material and a glue. To this basic combination, borax and cement may be added, and fiber and color may be used if desired.

The lime used will be a double hydrated lime such as is commercially available. This is the base of the mix and should form from 39.43% to 45.56% of the total of the ingredients. Using less than this amount tends to soften the mix and more slows up the setup time. Best results have been obtained using 42⅔%.

A good, light-weight aggregate such as perlite should be used to give body and strength to the mixture and, at the same time, hold down the weight of the finished product. For this use it must be white in color. Perlite is obtainable in a fairly coarse grind, approximately ⅟₁₆ inch particles, and at least a portion of the perlite used will be of this size. It has been found advantageous to use a finely ground perlite as partly of the total filler, as this permits a smoother finish to obtained. The fine perlite should be ground to a powdery consistency. The relative proportions of the coarse and fine perlite may be desired so long as the total is within the range of 17.39% to 27.84% of the mix. Coarse perlite in the amount of 6⅔% and fine perlite in the amount of 17⅓% of the total mix has given excellent results. It is economically unsound to go below the above range, and to exceed it results in a plaster which is too soft.

A gauging material, such as plaster of Paris, is used to give a quick set to hold the mixture until the lime has set. Good results have been obtained using a white gauging plaster manufactured by United States Gypsum Company and sold under the trademark "Red Top Champion." The gauging should be between 16.9% and 25.3% of the total mix, depending upon the speed desired for set up. Outside of these limits the set up speed will be too slow or too fast for practical purposes.

It has been found that the addition of from .67% to 7.5% of a glue such as a plastic resin glue, e.g. a urea-formaldehyde glue, disclosed in Dearing and Meiser U.S. 2,315,776 and 2,290,946 and Howard and Meiser U.S. 2,275,821, an animal glue, e.g. Cudahy Anchor Glue manufactured by Cudahy Packing Company, starch adhesive, and caseinate adhesives, will help bond the mix and, at the same time, give better control of the set up time. Some glue helps bonding, too much causes discoloration. Experiment shows 5⅓% to be best.

While the above ingredients combined with water have been found to give a satisfactory plaster, it is improved by the addition of borax and cement. Borax in amounts from .3% to 5.1% preferably 1⅓% are added to further control set up and to add hardness to the finished surface of the plaster. The material acts as a retarder and the more added, the slower the set up time.

A good grade of white Portland cement is added to give the desired degree of hardness to the plaster. The mix needs at least 1.4% cement to get requisite hardness, but the plaster becomes too brittle and will crack if more than 7.5% is used. About 5⅓% seems best.

It will be understood that all of the above materials are mixed together with sufficient water to give a practical working consistency. After mixing, the plaster is put upon the wall as a single coat of desired thickness. It is trowelled as soon as possible and until set up. The resulting wall is smooth, white, hard, strong and ready for painting or other finishing. It has been found that the same formula can be used for many different wall effects simply by using different trowelling techniques. Fiber can be added to the mix if unusual tensile strength is desired. Coloring may be added so that the plaster is tinted and the entire coat will have the same color throughout.

Numerous experiments have been tried with variations of the above proportions and the effects noted. Some of these are given as examples.

(1) A batch was mixed from the following ingredients and spread upon a board as a single coat:

13 ounces ground perlite
16 ounces lime
8 ounces gauging material (Plaster of Paris)
2 ounces plastic resin glue
Water to mix Fifteen minutes after the mix was put upon the board it was trowelled and its workability was satisfactory. When set up it was found that the plaster was too soft, that it was of satisfactory whiteness and fairly smooth. There was no apparent shrinkage but some cracking. It seemed evident that the amount of perlite was excessive.

(2) A batch was made from the following ingredients:

> 9 ounces perlite
> 16 ounces lime
> 12 ounces gauging
> 2 ounces plastic resin glue
> Water to mix No more trowelling was done after the mix had been on the board for forty-five minutes. In this case the resulting hardness was fairly satisfactory, but too much gauging material was used and the mix set up too fast.

(3) A batch was mixed according to the following formula:

> 5 ounces ground perlite
> 16 ounces lime
> 8 ounces gauging material
> 2 ounces plastic resin glue
> Water to mix This mix trowelled very well and was found to be of suitable whiteness. The hardness was not to the degree preferred, but it was found that this could be cured by the addition of the cement. Some bubbling appeared on the surface but there was no apparent shrinkage and no cracking.

(4) The following formula was used and included the borax and cement. It also included both coarse and fine perlite.

> 2½ ounces coarse perlite
> 6½ ounces fine perlite
> 16 ounces lime
> 8 ounces gauging
> 2 ounces glue
> ½ ounce borax
> 2 ounces white cement
> Water to mix This mix set in about one hour and twenty minutes after being put upon the board and seemed to have all of the characteristics of whiteness, hardness, smoothness, and workability desired in a one coat plaster. There was no apparent shrinkage and no cracking.

It will be apparent from the above that a suitable one coat plaster mix may be obtained by using the ingredients mentioned with some variation, but to obtain the desired characteristics, both from the standpoint of workable mix and a finished plaster, the ingredients must be within the ranges set out.

What is claimed is:

1. A mixture suitable for one-coat plastering consisting essentially of perlite in the range of about 17.39% to 27.84%, hydrated lime about 39.43% to 45.56%, plaster of Paris about 16.9% to 25.3%, glue about .67% to 7.5%, borax about .3% to 5.1%, and Portland cement about 1.4% to 7.5%.

2. A mixture suitable for one-coat plastering consisting essentially of perlite about 24%, hydrated lime about 42⅔%, plaster of Paris 21⅓%, glue about 5⅓, borax about 1⅓%, and Portland cement about 5⅓%.

3. In a mixture suitable for one-coat plastering as claimed in claim 2, said perlite being about 6⅔% coarse and about 17⅓% powder.

4. In a mixture suitable for one-coat plastering as claimed in claim 2, said glue being a plastic resin glue.

5. In a mixture suitable for one-coat plastering as claimed in claim 2, said cement being a white Portland cement.

6. A mixture suitable for one-coat plastering consisting essentially of coarse white perlite about 6⅔%, powdered white perlite about 17⅓%, double hydrated lime about 42⅔%, plaster of Paris about 21⅓%, plastic resin glue about 5⅓%, borax about 1⅓%, and white Portland cement about 5⅓%.

7. A composition suitable for one coat plastering comprising light weight aggregate in the range of about 17.39% to 27.84%, hydrated lime about 39.43% to 45.56%, plaster of Paris about 16.9% to 25.3%, glue about 0.67% to 7.5%, and Portland cement about 1.4% to 7.5%.

8. A composition suitable for one coat plastering comprising perlite in the range of about 17.39% to 27.84%, hydrated lime about 39.43% to 45.56%, plaster of Paris about 16.9% to 25.3%, glue about 0.67% to 7.5%, and Portland cement about 1.4% to 7.5%.

References Cited in the file of this patent

UNITED STATES PATENTS

| | | |
|---|---|---|
| 433,861 | Haigh | Aug. 5, 1880 |
| 613,085 | Smith | Oct. 25, 1898 |
| 1,194,926 | Anderson | Aug. 15, 1916 |
| 2,715,583 | Ziegler et al. | Aug. 16, 1955 |